Figure 1:
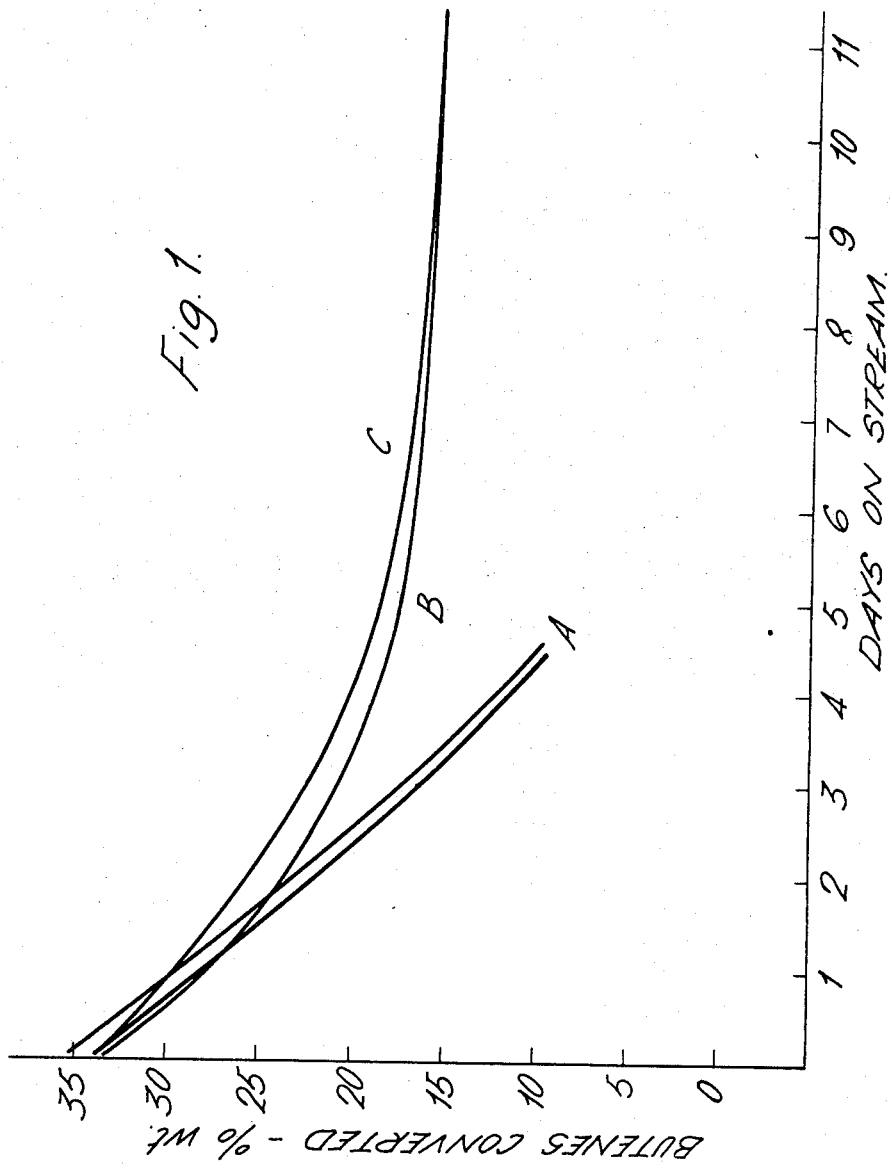

United States Patent
Martin et al.

[15] 3,668,270
[45] June 6, 1972

[54] OLEFIN PURIFICATION PROCESS

[72] Inventors: David Eric Martin, Camberley; Brian Michael Palmer, Shepperton, both of England

[73] Assignee: BP Chemicals Limited, London, England

[22] Filed: June 18, 1970

[21] Appl. No.: 47,350

[30] Foreign Application Priority Data

July 17, 1969   Great Britain.......................35,982/69

[52] U.S. Cl..........................................260/683 D, 260/677 A
[51] Int. Cl.................................................................C07c 11/12
[58] Field of Search.....................260/677 A, 677 AD, 683 D

[56] References Cited

UNITED STATES PATENTS 2,413,254   12/1946   Soday ....................................260/677

2,942,042   6/1960   Folz ....................................260/677 A

FOREIGN PATENTS OR APPLICATIONS 933,253   8/1963   Great Britain .....................260/677 A Primary Examiner—Delbert E. Gantz
Assistant Examiner—J. M. Nelson
Attorney—Morgan, Finnegan, Durham and Pine

[57] ABSTRACT

A process for the purification of an olefinic feedstock, particularly a feedstock for a disproportionation process over a rhenium heptoxide supported on alumina catalyst, by contacting the feedstock with a catalyst consisting essentially of a supported alkali metal at a temperature in the range $-50°$ to $+80°$ C and a pressure in the range 0 to 2,000 psig. and a Liquid Hourly Space Velocity in the range 0.01 to 100.

9 Claims, 2 Drawing Figures

OLEFIN PURIFICATION PROCESS

This invention relates to a process for the purification of olefin streams required as feedstocks for chemical conversion processes.

Olefinic streams derived from petroleum feedstocks are frequently contaminated by small quantities of impurities, some of which may be inherent in the material, some of which may have been introduced by treatments employed either to purify or to extract more valuable components from the stream.

When such contaminated streams are catalytically converted to products of higher value, it frequently happens that the impurities contained in them poison the catalyst over a fairly short period, thus decreasing its useful life and rendering the process more costly. Common contaminants which are known catalyst poisons are dienes, acetylenes and sulphur compounds.

Our co-pending application No. 56305/68 discloses a process for the desulphurization of an olefinic feedstock which process comprises contacting the feedstock with supported elemental nickel under conditions such that residual sulphur is adsorbed by the nickel substantially without the liberation of hydrogen sulphide.

We have now discovered a process in which other impurities, including dienes and acetylenes are removed.

Thus according to the present invention there is provided a process for the purification of an olefinic feedstock which process comprises contacting the feedstock with a catalyst comprising a supported alkali metal at a temperature in the range −50° to +80° C. and a pressure in the range 0 to 2,000 p.s.i.g.

A preferred olefinic feedstock is a feedstock suitable for a disproportionation process over a rhenium heptoxide/alumina catalyst system.

The temperature of treatment is preferably in the range 15° to 50° C.

The pressure under which treatment is effected is preferably in the range 20 to 500 p.s.i.g.

If higher temperatures and pressures are employed, then some oligomerization of the feedstock may occur in addition to the removal of impurities. If the preferred upper limits are not exceeded then oligomerization will be negligible.

The feedstock is suitably passed over the catalyst at a liquid hourly space velocity in the range 0.01 to 100, preferably 0.5 to 10.

The preferred alkali metals are sodium and potassium.

Suitable supports include (a) alumina, silica and sepiolite of high surface area, i.e., of surface area greater than 25 m$^2$/g and (b) inert substances of low surface area, e.g., sodium or potassium carbonate or chloride.

The optimum composition depends on the nature of the feedstock and the use to which it is to be put, as will subsequently be explained.

Supported alkali metal catalysts may be prepared by any convenient technique, depending on the metal and the support. Before the alkali metal is added, the support is preferably dried by calcination at elevated temperature, most preferably in the range 300° to 1,000° C to prevent loss of active alkali metal by reaction with water on the support.

Thus a suitable catalyst composition for use in accordance with the present invention is lithium or sodium dispersed on an anhydrous potassium compound.

Preferably the elemental alkali metal is sodium and the anhydrous potassium compound is potassium carbonate.

Preferably 1 – 20 percent, most preferably 2 – 6 percent by weight of sodium is dispersed on the potassium carbonate.

Suitable methods for preparing the catalyst are disclosed in British Patent specification No. 933,253.

This particular catalyst system does not isomerize olefins which are contacted with it and thus is very suitable for treating a feedstock in which isomerization is an undesirable side reaction.

Another suitable catalyst composition for use in accordance with the present invention is an alkali metal or mixture of alkali metals deposited on alumina.

The preferred alkali metal is potassium.

The preferred form of alumina is gamma alumina of surface area greater than 25 m$^2$/g.

Preferably the catalyst contains between 0.5 and 20 percent by weight of metal, expressed as a percentage by weight of the alumina, preferably between 1.0 and 10.0 percent, as measured by hydrolysis.

This particular catalyst system tends to isomerize olefins to their equilibrium proportions and thus is very suitable for treatment of a feedstock in which isomerization is a desirable side effect.

Another suitable catalyst composition for use in accordance with the present invention is sodium on silica.

The preferred form of silica is a precalcined silica gel of surface area greater than 100 m$^2$/g.

Suitably the catalyst contains between 0.1 and 25.0 percent by weight of sodium, preferably between 1.0 and 10 percent, expressed as a percentage by weight of the silica, as measured by hydrolysis. It is possible that in the process for the purification of the feedstock by contact with the catalysts of the invention metal alkyls are eluted, which themselves tend to deactivate disproportionation catalysts. However, disproportionation catalysts can easily be protected from these alkyls by the addition of a further guard bed of an inert material of high surface area, e.g. silica, which will adsorb the eluted metal alkyls.

The invention is illustrated by the following examples.

EXAMPLE 1

A feedstock containing essentially isobutene and butene-2 was co-disproportionated ated over a rhenium heptoxide on alumina catalyst protected by various guard beds.

Experimental details are set out below and the results are recorded graphically in FIG. 1 of the accompanying drawings.

A. Preparation of disproportionation catalyst.

Ammonium perrhenate (2.64 g) dissolved in deionized water was mixed on a water bath with 20 g of a pure boehmite of surface area 168 m$^2$/g, pore volume 0.40 ml/g and an average pore diameter of 105 A, and containing less than 0.01 percent by weight SO$_4^{2-}$. The resultant paste was dried in air at 110° C. The catalyst was activated for 24 hours in air and 1 hour in nitrogen at 580° C. The active catalyst contained 10 percent by weight rhenium heptoxide.

B. Guard Beds.

The active catalyst was divided into four parts. Two parts were set aside for use in Example 2. The third part was protected by sodium on alumina (Curve B, FIG. 1) and "Zeozorb" 3A molecular sieves, and the fourth part by potassium on alumina (Curve C, FIG. 1) in addition to "Zeozorb" 3A molecular sieves.

C. Preparation of alkali metal guard bed.

The alumina support used was a poorly crystalline alumina of surface area 309 m$^2$/g, pore volume 0.416 ml/g, average pore diameter 54.2 A and containing 4.9 percent by weight SO$_4^{2-}$.

The alumina was dried by calcination at 600° C in air for 24 hours and placed in a three necked flask fitted with a dry nitrogen purge and a stirrer of nichrome wire. The flask was heated on an oil bath at 180° C and the alkali metal, 3 percent by weight of the alumina added in small lumps. The material was prepared, stored and transferred under dry, oxygen-free nitrogen.

D. Feedstock

|  | % wt. |
|---|---|
| Isobutane | 2.3 |
| n-Butane | 8.0 |
| Butene-1 | 4.0 |
| Isobutene | 45.1 |
| Butene-2 | 40.6 |
| Sulphur | 6.4 ppm |

E. Guard Bed conditions

| | | |
|---|---|---|
| Pressure | psig | : 150 |
| Temperature | °C. | : 25 |
| Feed rate | LHSV | : 1.0 |

F. Co-disproportionation conditions

| | | |
|---|---|---|
| Pressure | psig | : 150 |
| Temperature | °C. | : 25 |
| Feed Rate | LHSV | : 10 |

G. Results:

The results are shown graphically in FIG. 1, Curves B and C, of the accompanying drawings.

EXAMPLE 2

The remaining two parts of the disproportionation catalyst prepared as described in Example 1(A) were protected by "Zeozorb" 3A molecular sieves. The feedstock for the disproportionation reaction, the guard bed conditions and the co-disproportionation conditions were as described in Example 1(D), (E) and (F) respectively. The results are shown graphically in FIG. 1 of the accompanying drawings as Curve A.

Example 2 is not an example of a process according to the invention and is provided only for comparison purposes. Comparison of Example 1 with Example 2 illustrates the increase in life of a rhenium heptoxide on alumina catalyst which can be obtained by the use of supported alkali metal guard beds where isomerization of the feed to equilibrium does not significantly alter the olefin distribution.

EXAMPLE 3

A. Preparation of disproportionation catalyst.

Ammonium perrhenate (2.64 g) dissolved in deionized water was mixed on a water bath with 20 g of a poorly crystalline alumina of surface area 309 m²/g, pore volume 0.416 ml/g, average pore diameter 54.2 A and containing 4.5 percent weight $SO_4^{2-}$. The resultant paste was dried in air at 110° C. The catalyst was activated for 24 hours in air and 1 hour in nitrogen at 580° C. The active catalyst contained 10 percent by weight rhenium heptoxide.

B. Guard Beds.

The active catalyst was divided into two parts. The first part was set aside for use in Example 4 and the second (Curve B, FIG. 2) was protected by 3 percent sodium on potassium carbonate in addition to "Zeozorb" 3A molecular sieves. The metal alkyls eluted from this guard bed were adsorbed onto a bed of sepiolite.

C. Preparation of alkali metal guard bed.

The guard bed was prepared as in Example 1 but the support used was potassium carbonate supplied by British Drug Houses Limited (Analar Crude). The potassium carbonate was dried at 350° C for 2 hours in vacuo before use.

D. Feedstock.

| | % wt. |
|---|---|
| Propylene | 1.27 |
| Butane | 45.28 |
| Isobutene | 5.50 |
| Butene-1 | 17.53 |
| Butene-2 | 30.42 |

E. Guard Bed conditions.

| | | |
|---|---|---|
| Pressure | psig | : 150 |
| Temperature | °C. | : 25 |
| Feed Rate | LHSV | : 1.0 |

N.B. These conditions apply to both the Na/K₂CO₃ and the sepiolite guard beds.

F. Co-disproportionation bed conditions.

| | | |
|---|---|---|
| Pressure | psig | : 150 |
| Temperature | °C. | : 25 |
| Feed Rate | LHSV | : 20 |

G. Results.

Figure 2:
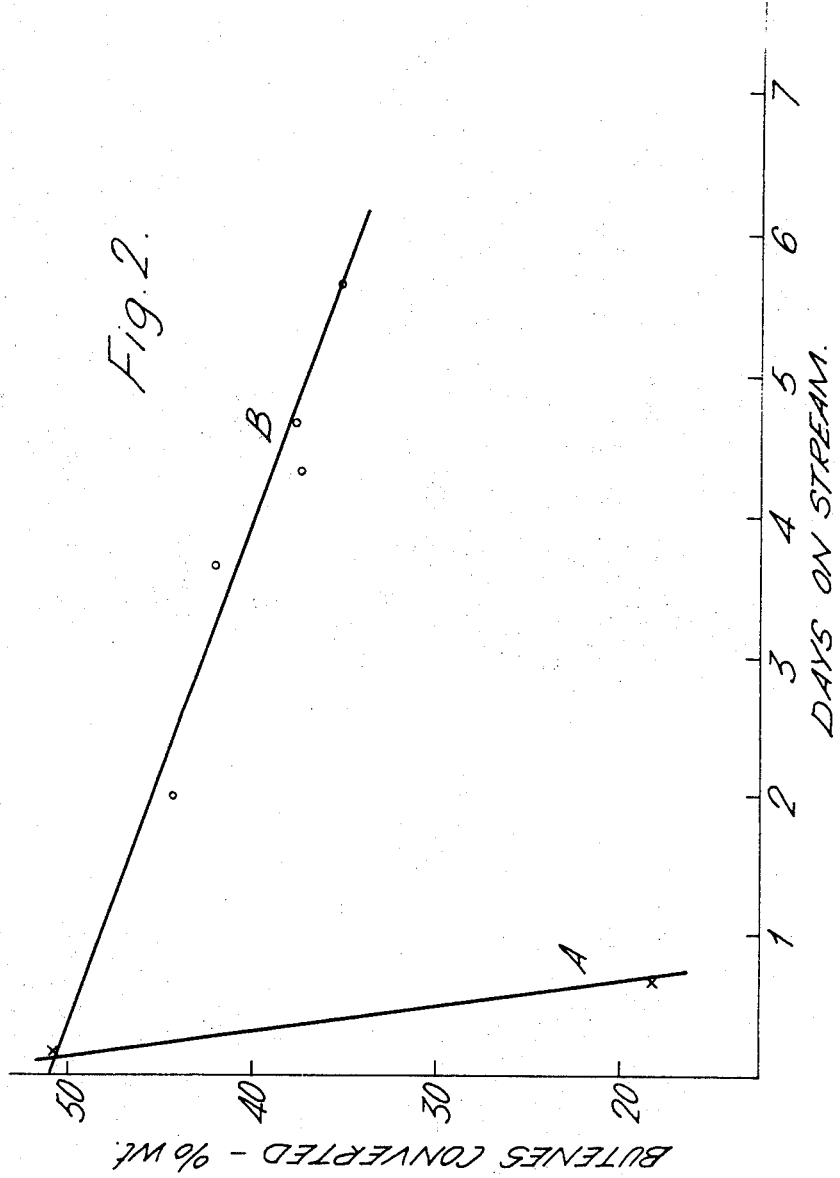

The results are shown graphically in FIG. 2, Curve B of the accompanying drawings.

EXAMPLE 4

The remaining part of the disproportionation catalyst prepared as described in Example 3(A) was protected by "Zeozorb" 3A molecular sieves. The feedstock for the disproportionation reaction, the guard bed conditions and the co-disproportionation conditions were as described in Example 3(D), (E), and (F) respectively. The results are shown graphically in FIG. 2 (Curve A).

Example 4 is not an example of a process according to the invention, and is provided only for comparison purposes. Comparison of Example 3 with Example 4 illustrates the use of a supported alkali metal guard bed which will not isomerize olefins (no isomerization of the butene-1 in the feed to butene-2 was detected) and the use of an adsorbent to prevent deactivation of the $Re_2O_7:Al_2O_3$ by metal alkyls (the product from sodium or potassium carbonate can contain up to 50 ppm of sodium and potassium).

We claim:

1. In a process for the disproportionation of olefinic feedstocks by contact with a rhenium heptoxide supported on alumina catalyst, the improvement which comprises purifying the olefinic feedstock for the disproportionation process by contact with a catalyst comprising a supported alkali metal at a temperature in the range −50° to +80° C, a pressure in the range 0 to 2,000 p.s.i.g and a Liquid Hourly Space Velocity in the range 0.01 to 100 prior to contact with the said disproportionation catalyst.

2. A process as claimed in claim 1 wherein the alkali metal is selected from sodium or potassium.

3. A process as claimed in claim 1 wherein the support is selected from alumina, silica or sepiolite of surface area greater than 25 m²/g.

4. A process as claimed in claim 1 wherein the support comprises an inorganic salt selected from the carbonate or chloride of an alkali metal selected from sodium or potassium.

5. A process as claimed in claim 1 wherein the support is dried by calcination at a temperature in the range 300° to 1,000° C.

6. A process as claimed in claim 1 wherein the catalyst comprises 1 to 20 percent, expressed as a percentage by weight of the support, of sodium dispersed on anhydrous potassium carbonate.

7. A process as claimed in claim 1 wherein the catalyst comprises 0.5 to 20 percent of potassium deposited on gamma alumina of surface area greater than 25 m²/gram, the weight of potassium being expressed as a percentage by weight of alumina as measured by hydrolysis.

8. A process as claimed in claim 1 wherein the catalyst comprises 0.1 to 25 percent of sodium deposited on a precalcined silica of surface area greater than 100 m²/gram, the weight of sodium being expressed as a percentage by weight of silica as measured by hydrolysis.

9. A process as claimed in claim 1 wherein metal alkyls formed by reaction of the feedstock with the catalyst are removed from the purified olefin stream by the passage of the olefin over a further guard bed of an inert material of high surface area.

* * * * *

UNITED STATES PATENT OFFICE
CERTIFICATE OF CORRECTION

Patent No. 3,668,270   Dated June 6, 1972

Inventor(s) David Eric Martin et al

It is certified that error appears in the above-identified patent and that said Letters Patent are hereby corrected as shown below:

Under "ABSTRACT", Line 5,
for "-50°"   read   -- -50°C --

Col. 1, Line 32,
for "-50°"   read   -- -50°C. --

Col. 2, Line 33,
for "ated over"   read   -- over --

Col. 4, Line 31,
for "-50°"   read   -- -50°C --

Col. 4, Line 44,
for "300°"   read   -- 300°C --

Signed and sealed this 2nd day of January 1973.

(SEAL)
Attest:

EDWARD M. FLETCHER, JR.
Attesting Officer

ROBERT GOTTSCHALK
Commissioner of Patents